(12) United States Patent
Mahe

(10) Patent No.: US 6,459,685 B1
(45) Date of Patent: Oct. 1, 2002

(54) REDUCTION OF THE MESSAGE TRAFFIC IN A DISTRIBUTED NETWORK

(75) Inventor: Jean-Michel Mahe, Suce-sur-Erdre (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/184,034

(22) Filed: Nov. 2, 1998

(30) Foreign Application Priority Data

Nov. 3, 1997 (FR) ............................................. 97 13785
Nov. 3, 1997 (FR) ............................................. 97 13782

(51) Int. Cl.$^7$ ............................ H04Q 7/00; H04L 12/28
(52) U.S. Cl. ....................................... 370/313; 370/338
(58) Field of Search ................................. 370/255, 202, 370/396, 254, 312, 389, 381, 428, 471, 474, 382, 392, 400, 401, 238, 465, 313, 338, 328, 349, 445, 213; 379/220

(56) References Cited

U.S. PATENT DOCUMENTS

| | | | |
|---|---|---|---|
| 5,142,531 A | * 8/1992 | Kirby ......................... | 370/94.3 |
| 5,245,607 A | * 9/1993 | Caram ......................... | 370/94.1 |
| 5,253,161 A | * 10/1993 | Nemirovsky et al. ....... | 364/402 |
| 5,262,906 A | * 11/1993 | Mazzola ...................... | 370/54 |
| 5,317,566 A | * 5/1994 | Joshi .......................... | 370/60 |
| 5,343,466 A | * 8/1994 | Kawamura ................... | 370/54 |
| 5,394,436 A | * 2/1995 | Meier et al. ................. | 375/202 |
| 5,404,451 A | * 4/1995 | Nemirovsky et al. ....... | 395/200 |
| 5,453,977 A | * 9/1995 | Flammer, III et al. ....... | 370/54 |
| 5,481,535 A | 1/1996 | Hershey ....................... | 370/60 |
| 5,596,719 A | * 1/1997 | Ramakrishnan et al. .................... | 395/200.02 |
| 5,608,726 A | * 3/1997 | Virgile ........................ | 370/401 |
| 5,740,160 A | * 4/1998 | Ikegami et al. ............. | 370/255 |

(List continued on next page.)

FOREIGN PATENT DOCUMENTS

| | | |
|---|---|---|
| EP | 0 481 610 A2 | 4/1992 |
| EP | 0 726 663 A2 | 8/1996 |
| WO | WO 97/02677 | 1/1997 |

OTHER PUBLICATIONS

Shacham, Nachum, and Westcott, Jil, "Future Directions in Packet Radio Architectures and Protocols", Proceedings of the IEEE, vol. 75, No. 1, Jan. 1987, pp. 83–99.

Jubin, John, and Tornow, Janet D., "The DARPA Packet Radio Network Protocols", Proceedings of the IEEE, vol. 75, No. 1, Jan. 1987, pp. 21–32.

Primary Examiner—Chau Nguyen
Assistant Examiner—Chiho Andrew Lee
(74) Attorney, Agent, or Firm—Fitzpatrick, Cella, Harper & Scinto

(57) ABSTRACT

Messages are broadcast between a plurality of stations in a wireless network where each station has a memory storing a respective first table containing identifiers of final destination stations of messages associated with identifiers of intermediate destination stations of messages, wherein any station under consideration broadcasts a message when it receives a message. Data relating to a received message, including at least one message identifier and an identifier of a station sending the message, is stored in a second table. The message identifier is compared with message identifiers previously stored in the second table. In the first table of the station under consideration, a group of stations which are both a final destination station and an intermediate destination station are sought, and a second message is broadcast over the wireless network in a case where the identifier of the received message is different from the message identifiers previously stored in the second table and where the group includes at least one station different from the station which sent the message.

19 Claims, 6 Drawing Sheets

U.S. PATENT DOCUMENTS

| | | | | |
|---|---|---|---|---|
| 5,805,593 | A | * | 9/1998 | Busche .................... 370/396 |
| 5,812,531 | A | * | 9/1998 | Cheung et al. ............ 370/255 |
| 5,848,145 | A | * | 12/1998 | Gallagher et al. ......... 379/220 |
| 5,886,643 | A | * | 3/1999 | Diebboll et al. ....... 340/825.08 |
| 5,901,362 | A | * | 5/1999 | Cheung et al. ............ 455/525 |
| 5,914,939 | A | * | 6/1999 | Serkowski ................ 370/254 |
| 5,930,236 | A | * | 7/1999 | Havansi .................... 370/254 |
| 5,949,760 | A | * | 9/1999 | Stevens et al. ............ 370/254 |
| 5,963,546 | A | * | 10/1999 | Shoji ........................ 370/255 |
| 6,289,096 | B1 | * | 9/2001 | Suzuki ...................... 379/221 |

* cited by examiner

| TR_c | Destination | Next jump | Cost |
|---|---|---|---|
| | $SM_a$ | $SM_b$ | 2 |
| | $SM_b$ | $SM_b$ | 1 |
| | $SM_c$ | $SM_c$ | 0 |
| | $SM_d$ | $SM_d$ | 1 |
| | $SM_e$ | $SM_d$ | 2 |

REDUCTION OF THE MESSAGE TRAFFIC IN A DISTRIBUTED NETWORK

The present invention concerns communications between the stations of a distributed type network.

The network is for example a local wireless network, the stations of which communicate with one another by sharing a radio channel.

A distributed type network does not have a base station to manage the communications between the stations.

In a first aspect, the invention concerns the broadcasting of messages in the network.

According to a known broadcasting mechanism used in a MAC (Medium Access Control) access protocol for a local wireless network of the distributed type, each station in the network rebroadcasts the messages which it receives.

The messages have for example a limited life, which can be expressed by a maximum number of rebroadcasts. As long as a message has not reached its maximum rebroadcasting number, it is rebroadcast.

The rebroadcasting of messages means that a station may receive duplicated messages, that is to say those containing the same useful data, from several different stations. The station under consideration will rebroadcast each of these messages. In other words, the station under consideration receives the "same" message several times, and rebroadcasts it on each occasion. The duplicated data are then sorted and eliminated by layers on top of the MAC layer. This system generates a great deal of traffic and therefore a high occupation of the radio channel, to the detriment of new data messages. In addition, this increases the risk of collision of messages and consequently the risk of the loss of a message.

In order to improve message broadcasting, it is possible to select a sub-set of stations which are distributed through the network which alone will be authorized to rebroadcast the messages received in a broadcast. The number of rebroadcasts is thus limited. However, a station always rebroadcasts a message at least once. In addition, it is possible for it to rebroadcast the "same" message several times.

In a second aspect, the invention concerns the routing of messages in the network.

A routing function makes communications possible between the stations of the network, by determining the communication paths in the network. This function is adapted to the constraints of a local wireless network, notably the limited passband, and the mobility of the stations or alterations in the station environment which produce changes in the network topology.

Known routing methods are based on periodic exchanges of routing messages in order to detect changes in network topology. The routing function must modify the communication paths in the network as quickly as possible, so that the known paths correspond to the actual paths existing in the network, otherwise the risk of faulty routing and loss of messages is great. It is therefore necessary for the routing messages to be frequent.

However, the routing messages occupy the radio channel, to the detriment of useful data. The routing function must therefore generate as few routing messages as possible, in order to occupy little passband.

These constraints are conflicting and make the operation of the routing function complex.

The present invention aims to remedy the drawbacks of the prior art by providing a method enhancing communications between the stations of a distributed network.

Firstly, the invention provides a message broadcasting method which monitors the messages at the MAC layer, before rebroadcasting them.

For this purpose, the invention proposes a method of broadcasting messages between stations in a network, each station having in memory a respective first table containing identifiers of final destination stations of messages associated with identifiers of intermediate destination stations of messages, characterised in that any station under consideration performs the following operations when it receives a message:

storing in a second table data relating to the said message and including at least one message identifier and an identifier of a station sending the said message, comparing the message identifier with the message identifiers previously stored in the second table, seeking in the first table of the station under consideration a group of stations which are both a final destination station and an intermediate destination station, and broadcasting a second message if and only if the identifier of the said message is different from the identifiers previously stored in the second table and if the said group includes at least one station different from the station which sent the said message.

The method according to the invention resolves the problem stated above, by using data traffic at the MAC (Medium Access Control) level. The invention uses on the one hand the data messages transported in the network and on the other hand the station routing table, in order to determine whether a message is to be rebroadcast. Message rebroadcastings are less numerous, which reduces the risk of collision and therefore of message loss.

The broadcast data can be user data or routing information, for example.

According to a preferred characteristic, the second message has a message identifier which is that of the said message and an intermediate sending station address which is that of the station under consideration. The broadcasting of the second message is equivalent to the rebroadcasting of the message currently being processed.

According to another preferred characteristic, the message identifier includes the address of the initial sending station of the first of a set of previous messages having the same message identifier as the said message. The messages are thus identified simply and reliably.

Correlatively, the invention concerns a communication station in a network, having in memory a respective first table containing identifiers of final destination stations of messages associated with identifiers of intermediate destination stations of messages, characterised in that it has, or in that it is adapted to cooperate with:

means of storing in a second table data relating to a message which it receives and including at least one message identifier and an identifier of a station sending the said message, means of comparing the message identifier with the message identifiers previously stored in the second table, means of seeking in the first table of the station under consideration a group of stations which are both a final destination station and an intermediate destination station, and means of broadcasting a second message if and only if the identifier of the said message is different from the identifiers previously stored in the second table and if the said group includes at least one station different from the station which sent the said message.

The communication station according to the invention has the same advantages as those of the method described previously.

Secondly, the invention provides a method of detecting paths and transmitting routing information in a distributed network, which makes it possible to detect the rupture of a link and to transmit the corresponding information, rapidly and independently of the execution of the routing algorithm.

To this end, the invention proposes a method of routing messages between stations in a network, each station having in memory a respective first table containing identifiers of final destination stations of messages respectively associated with identifiers of intermediate destination stations of messages, characterised in that any station under consideration performs the following operations when it receives a data message:

storage, in a respective second table, of data concerning the message and including at least one message identifier, an intermediate sending station identifier, an intermediate destination station identifier, a final destination station identifier and a message retransmission number, and, if the message retransmission number reaches a predetermined value, if the station under consideration is not the intermediate destination station and if the station under consideration has in its first table the final destination station identifier associated with an intermediate destination station identifier different from that of the intermediate sending station, sending of a specific routing message intended for the intermediate sending station in order to indicate to it the existence of a path between the station under consideration and the final destination station.

The method according to the invention resolves the problem stated above, by using the data messages transported in the network in order to deduce that there is the rupture of a link between two stations, in order to transmit an item of routing information to the station which has suffered the link rupture, or to a set of stations.

The method makes it possible to modify the routing tables of the stations in the network very quickly, independently of the periodicity of the execution of the routing algorithm.

By virtue of the method according to the invention, the mobile stations are aware of the changes to the paths in the network. By taking account of these modifications in order to modify the station routing tables, the number of messages lost is considerably reduced. The routing of the communications is thus made more reliable.

The method adapts to any known routing function, whose execution is independent of the method according to the invention. By virtue of the reliability obtained by the invention, the routing algorithm can be executed with a greater period, and consequently generate fewer routing messages. The increase in routing traffic due to the specific routing messages according to the invention is thus negligible compared with the reduction in routing traffic due to the longer period of the routing algorithm.

The performance of the network is thus improved, it resists better the disturbances consisting of the link ruptures, and is therefore more robust overall.

According to preferred characteristics, the specific routing message includes as least the address of the station under consideration, the final destination station of the said message, and a transmission cost between the station under consideration and the final destination station of the said message, or the specific message contains up to the entire first table of the station under consideration.

These data make it possible to modify the routing table of the destination station of the specific routing message.

According to a preferred characteristic, the message identifier includes the address of the initial sending station of the first of a set of previous messages having the same message identifier as the said message. The messages are thus identified simply and reliably.

In another aspect, the invention proposes a method of routing messages between stations in a network, each station having in memory a respective first table containing identifiers of final destination stations of messages respectively associated with identifiers of intermediate destination stations of messages, characterised in that any station under consideration performs the following operations, when it receives a specific routing message indicating the existence of a path between two stations:

ascertaining whether the station under consideration is a destination of the specific routing message and, in the event of a positive response, modifying the first table of the station under consideration according to the specific routing message.

The routing table is thus modified quickly and a new path can be used as from the next message to be routed.

The invention also concerns a communication station in a network, having a memory for storing a respective first table containing identifiers of final destination stations of messages respectively associated with identifiers of intermediate destination stations of messages, characterised in that it has, or in that it is adapted to cooperate with:

means of storing, in a respective second table, data concerning each data message which it receives, these data including at least one message identifier, an intermediate sending station identifier, an intermediate destination station identifier, a final destination station identifier and a message retransmission number, means of checking that the message retransmission number reaches a predetermined value, that the station under consideration is not the intermediate destination station and that the station under consideration has in its first table the final destination station identifier associated with an intermediate destination station identifier which is different from that of the intermediate sending station, means of sending a specific routing message destned for the intermediate sending station in order to indicate to it the existence of a path between the station under consideration and the final destination station.

In another aspect, the invention proposes a communication station in a network, having in memory a respective first table containing identifiers of final destination stations of messages respectively associated with identifiers of intermediate destination stations of messages, characterised in that it has, or in that it is adapted to cooperate with:

means of receiving a specific routing message indicating the existence of a path between two stations, means of ascertaining whether the station under consideration is the destination of the specific routing message, and means of modifying the first table of the station under consideration as a function of the specific routing message.

The communication station according to the invention has the same advantages as those of the method which were described previously.

The present invention also concerns a storage medium, such as a floppy disk or a CD-ROM.

The advantages of this storage medium are similar to those previously described.

The characteristics and advantages of the present invention will emerge more clearly from a reading of two preferred embodiments illustrated by the accompanying, drawings, in which.

Figures 1, 3:
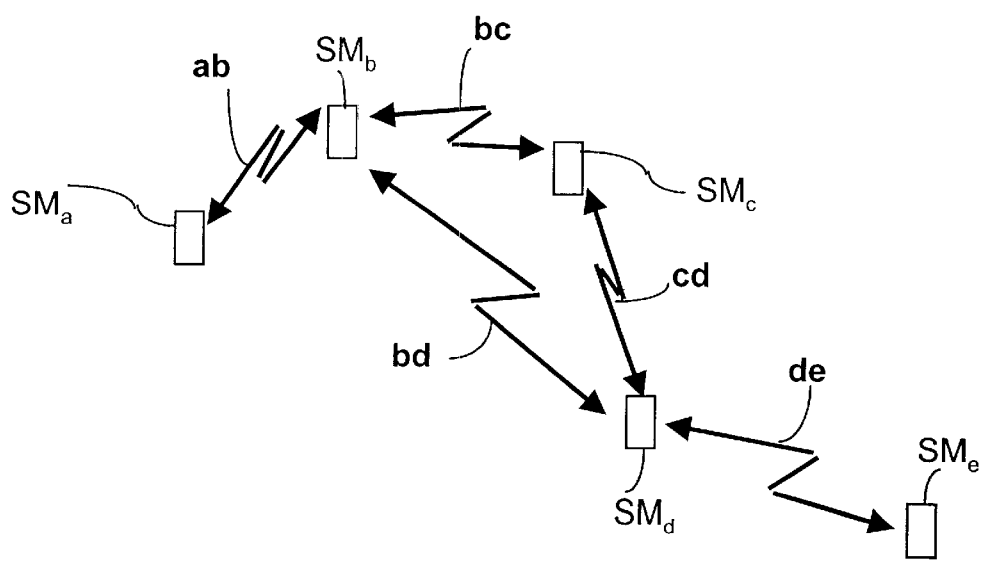
FIG. 1 depicts a distributed network of stations.
Figure 4:
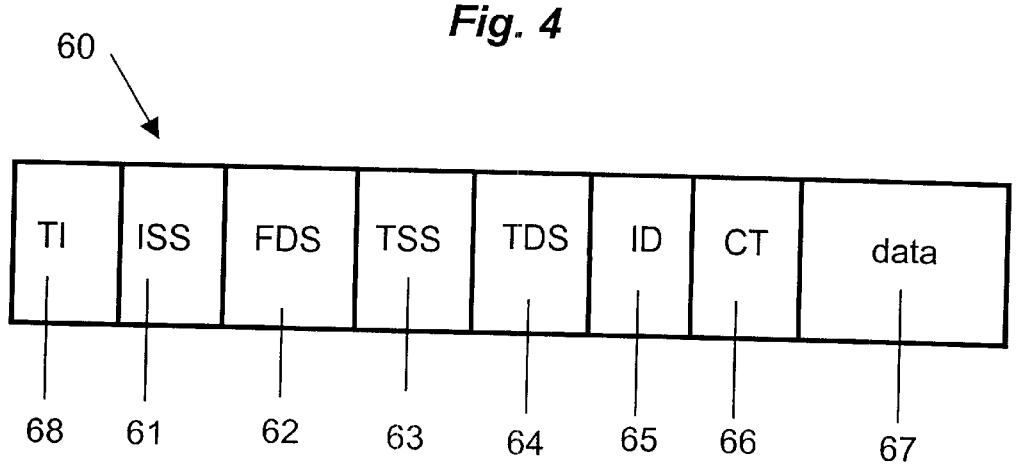
Figure 5:
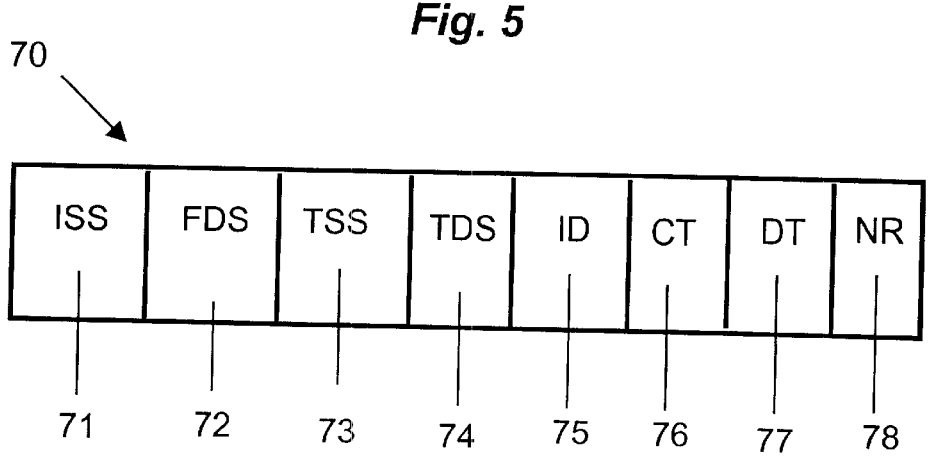
Figure 6:
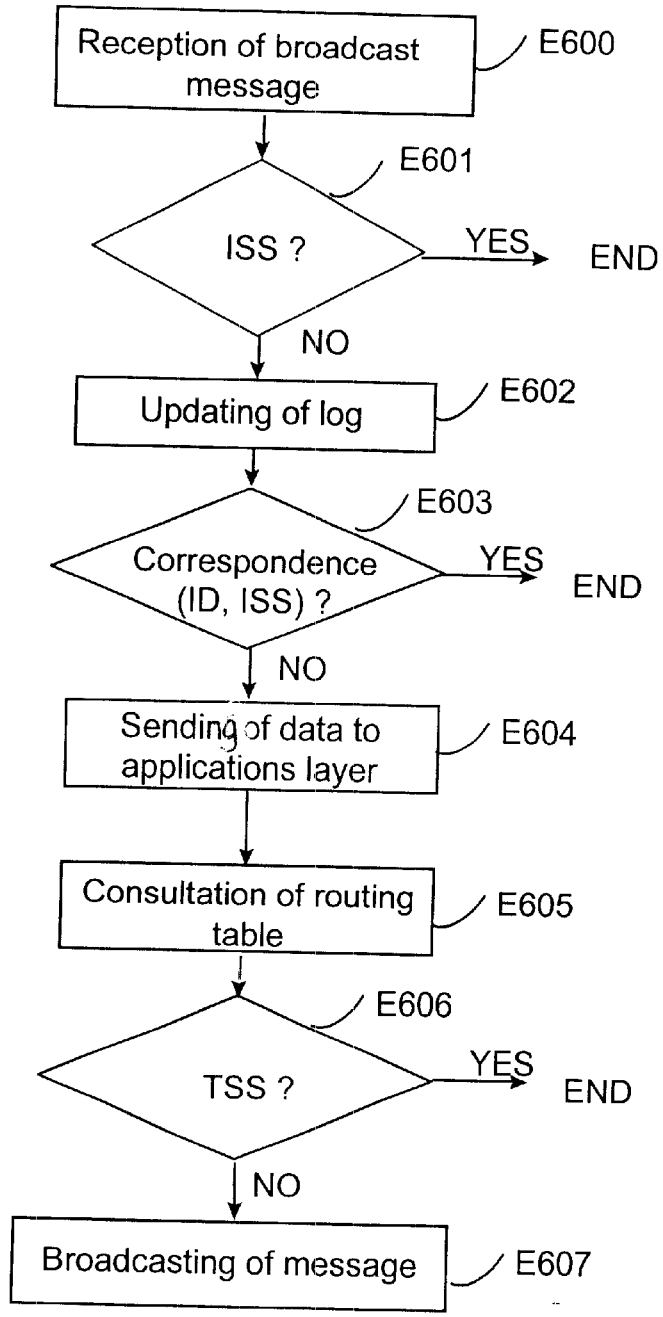
Figure 7:
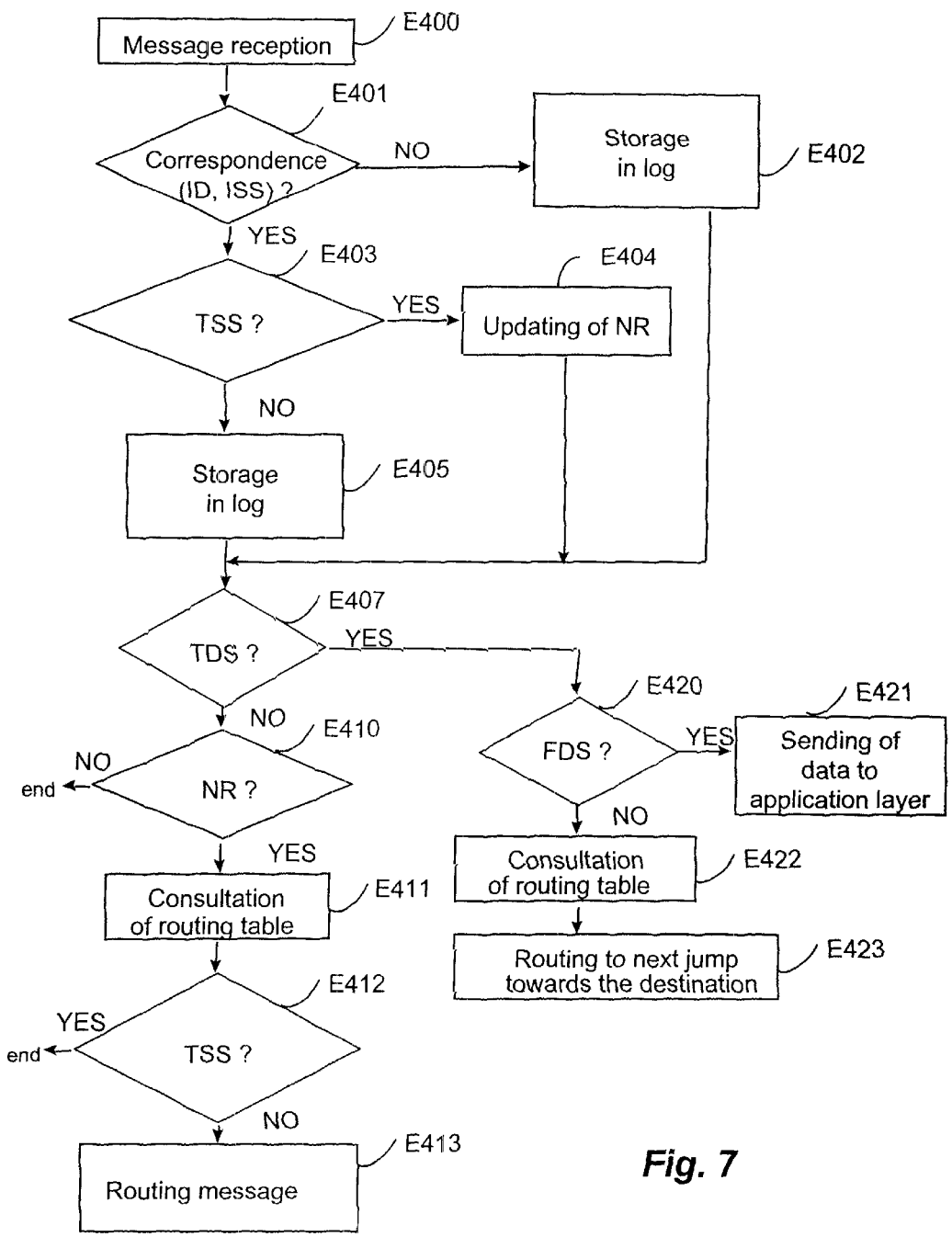
Figure 8:
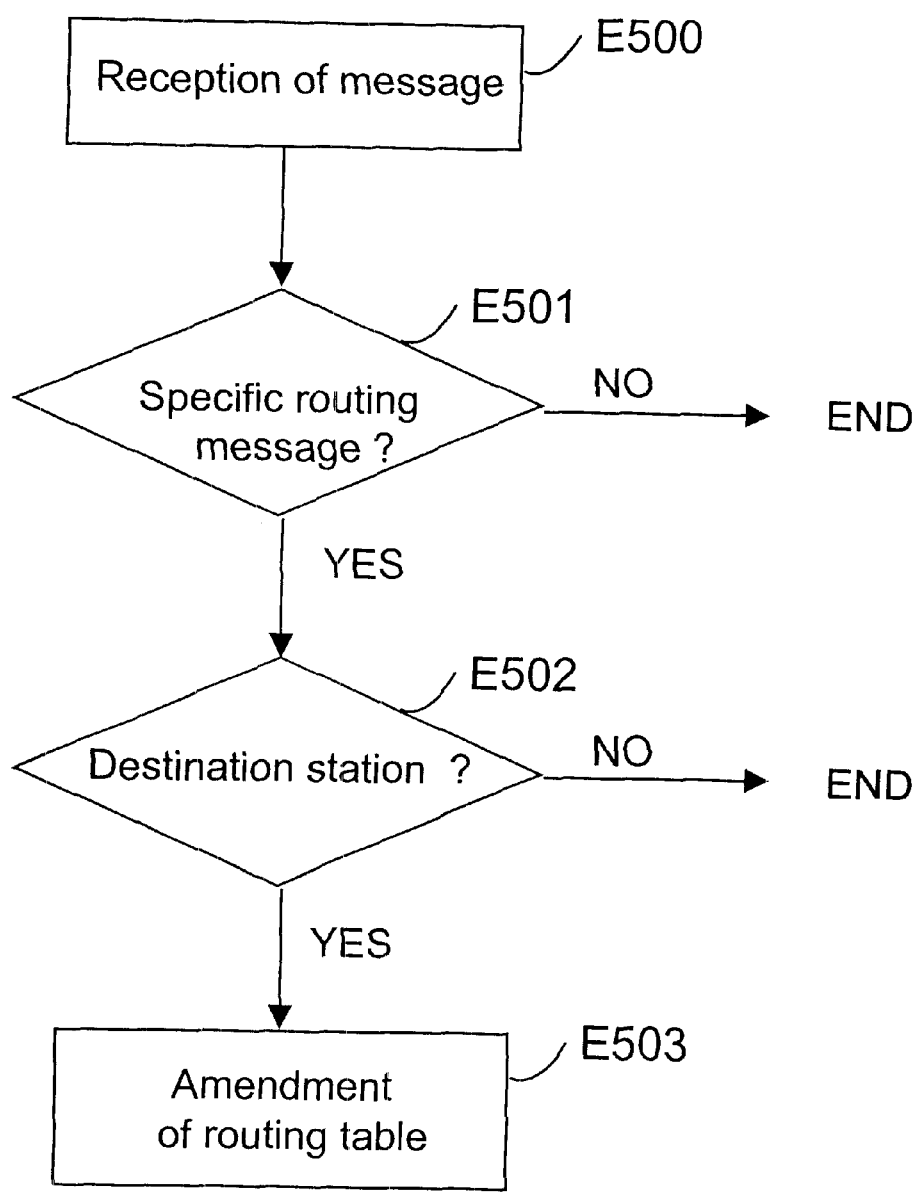

FIG. 3 depicts a routing table of one of the mobile stations of the network of FIG. 1, FIG. 4 depicts a data message transmitted from one mobile station to another, FIG. 5 depicts an extract from a table of messages heard by one of the mobile stations of the network, according to the invention, FIG. 6 is a data message processing algorithm according to an embodiment of the invention, FIG. 7 is an algorithm for processing data messages and detecting link breaks, according to another embodiment of the invention, FIG. 8 is an algorithm for processing specific routing messages.

According to the embodiment chosen and depicted in FIG. 1, a local wireless network includes stations, five of which, referenced $SM_a$ to $SM_e$, are depicted. Here the stations are mobile. The connectivity of the mobile stations is continuously changing, according to the movements of the stations and alterations in their environment. Furthermore, it is possible that the number of mobile stations actually connected to the network also changes. The stations communicate with one another by radio transmission, or as a variant by infrared transmission. Each station, or node of the network, is located by a unique address.

The network is of the distributed type, that is to say it does not have a base station to manage the inter-station communications.

What is of interest here for the first embodiment is inter-station communications which are effected in a broadcasting made at the MAC (Medium Access Control) level.

As far as the second embodiment is concerned, communications in point-to-point mode are of more particular interest here.

Communications in point-o-point mode are made possible by a routing function. If two stations, for example the stations $SM_a$ and $SM_b$, are in direct hearing, that is to say if these two stations are sufficiently close to one another and without any obstacle to radio transmission, they can communicate directly over the segment "ab". The station $SM_a$ can send a message, detailed subsequently, to the station $SM_b$. The station $SM_a$ is referred to as the initial sending station, and the station $SM_b$ is referred to as the final destination station.

On the other hand, if two stations, for example the stations $SM_a$ and $SM_d$, cannot communicate directly, the communication goes through other intermediate stations, here the stations $SM_b$ and $SM_c$, which act as relays between the two stations $SM_a$ and $SM_d$. The message is then transmitted successively over the segments "ab", then "bc", and finally "cd". These three segments form a path between the stations $SM_a$ and $SM_d$.

The routing function is executed on top of a MAC (Medium Access Control) access mechanism of CSMA/CA (Carrier Sense Multiple Access/Collision Avoidance) type which makes it possible to share the transmission channel. In the case of point-to-point communications, as considered here, the reliability of the data communications is ensured by the use of a conventional receipt, or acknowledgement, mechanism, and retransmission of the data, if the acknowledgement is not received.

The routing function is known per se and will not be described further.

Figure 2:
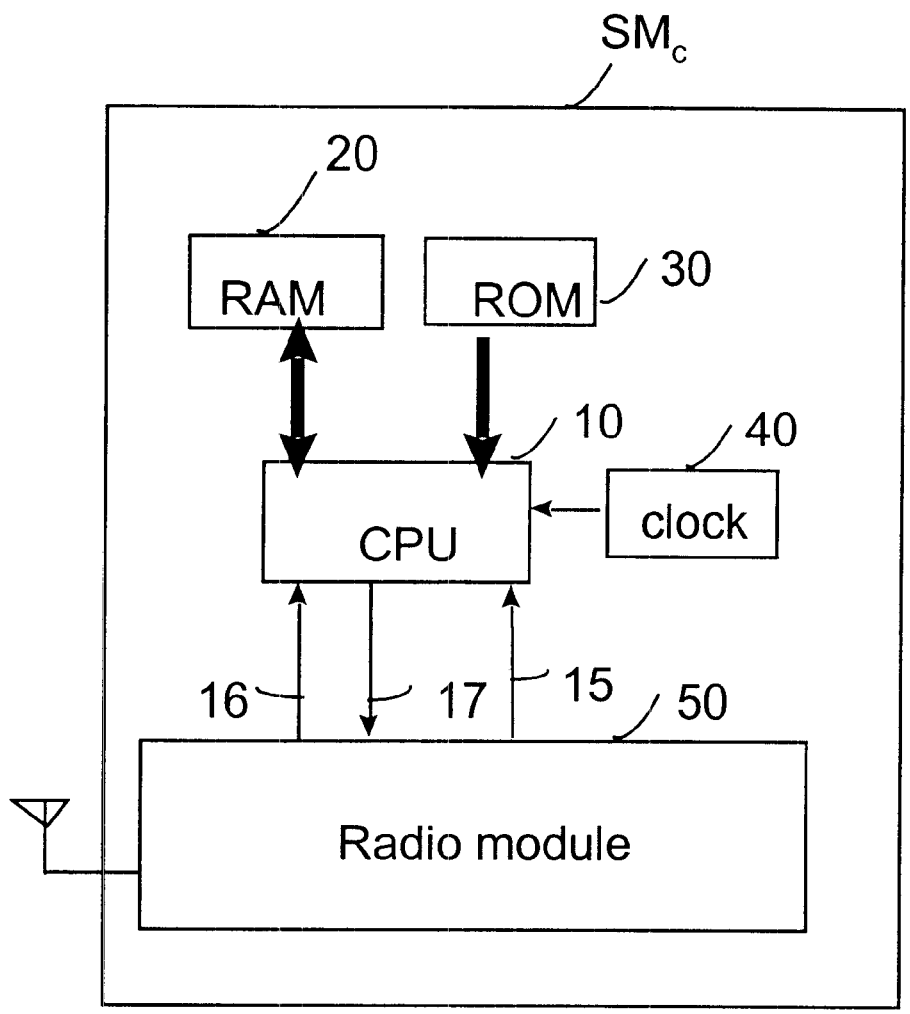
FIG. 2 depicts a mobile station of the network of FIG. 1.

An embodiment of any one of the stations, for example the station $SM_c$, is depicted in FIG. 2. The means of implementing the invention are incorporated into a computer which has conventional user interfaces, not described here. As a variant, the means of implementing the invention are not incorporated into a mobile station proper, but these means and the mobile station are adapted to communicate and cooperate together.

The station $SM_c$ incorporates a central processing unit in the form of a processor 10 connected by a bus on the one hand to a read-only memory (ROM) 30 in which the programs executed by the processor are recorded, and on the other hand to a random access memory (RAM) 20 having a working area, data registers and an area reserved for the storage of messages received or awaiting transmission. The random access memory 20 stores, among other things, a log, described subsequently, corresponding to the table of the latest messages received and heard by the mobile station $SM_c$.

The mobile station $SM_c$ includes a radiofrequency communication module 50, known per se, allowing the mobile station $SM_c$ to send and receive data to and from other mobile stations.

The interface between the radiofrequency communication module 50 and the processor 10 is achieved by:

the control port 15, the binary value of which represents the occupancy state of the wireless transmission medium at a given instant, the read port 16, from which the processor 10 reads the data received by the mobile station $SM_c$, the write port 17, where the mobile station $SM_c$ can go to write the data it wishes to send via the radiofrequency transmission medium.

A clock 40, connected to the processor 10, allows the latter to carry out operations at regular intervals, such as for example, the read/write operations to the ports 15, 16, 17.

The mobile stations allow the users of the local wireless network to exchange data along paths which may vary over time and which may make use of a number of intermediate stations, these paths being established from routing tables of the mobile stations of the network.

To implement the routing function, each mobile station has in memory a routing table depicted in FIG. 3. The routing table $TR_c$ of the station $SM_c$ includes a list of each station (the final destination station) accessible from the station under consideration, the next station (the intermediate destination station) to be reached in order to reach each accessible station and the cost to reach each accessible station. The cost is for example the number of jumps necessary, that is to say the number of segments to be covered, in order to reach each of the accessible stations. According to variant embodiments, the cost may take into account for example the signal to noise ratio, the message reception level, the transportation times, or the number of neighbouring stations of the station under consideration, or may again be a combination of these parameters.

Thus, for example, it is possible to reach the station $SM_e$ from the station $SM_c$, the next station being $SM_d$, and the cost, that is to say here the number of jumps, being two.

The routing table of a station is valid at a given instant, and may change over time.

Furthermore, the routing table of a station may include other information, such as sequence number and flag, for example, which are not of use for the present invention.

As depicted in FIG. 4, the data are exchanged between stations in the form of a message 60 including at least the following fields:

the field 61 containing the address ISS of the initial sending station of the message, the field 62 containing the address FDS of the final destination station of the message (the address FDS may be a broadcasting address), the field 63 containing the address TSS of the intermediate sending station, the field 64 containing the address TDS of the intermediate destination station (the address TDS may be a broadcasting address), the field 65 containing a message identifier ID created by the initial sending station, the field 66 containing the cost CT of the message, updated by each intermediate station and by the final destination station, the field 67 of data proper, the field 68 containing the type TI of the message, for example a data message.

In the general case, the initial sending and final destination stations are the ends of the path to be travelled by the message. The intermediate sending and intermediate destination stations are the ends of a segment of the path.

In the particular case of the broadcasting of a message which is considered here, all the stations in the network, except for the one which sent the message, are destinations of the message. In order to indicate that the message is transmitted in broadcast mode, the intermediate and final destination station addresses are at a specific value IFD.

The cost CT can be used to limit the number of jumps, and consequently the life span of the messages.

Each station stores data on each of the messages it receives, or more generally each of the messages it hears, even for the messages not intended for it. This data is stored in a specific table, or log, the predetermined size of which, corresponding to a time window, is chosen according to a maximum message transportation time in the network. As depicted in FIG. 5, for each message received, the station $SM_d$ stores the following data:

the field 71 containing the address ISS of the initial sending station of the message, the field 72 containing the address FDS of the final destination station of the message, the field 73 containing the address TSS of the intermediate sending station, the field 74 containing the address TDS of the intermediate destination station, the field 75 containing the message identifier ID created by the initial sending station, the field 76 containing the cost CT of the message, updated by each station which hears the message, the field 77 containing the date DT when message heard, the field 78 containing the number NR of retransmissions.

The values of the first six fields are derived from the message received and the last two are updated by the station $SM_d$. The date DT when message heard is not used by the present invention and can serve notably for monitoring the transportation times or limiting the life span of the messages. The cost CT is here equal to the accumulated number of all the messages having the same identifier as the message under consideration.

FIG. 6 depicts an algorithm, according to the first embodiment of the invention, used in each of the mobile stations in the network, when a message is received, for processing this message. The algorithm includes steps E600 to E607, which are stored in read-only memory 30.

This algorithm can be, totally or partially, memorised in any storage medium SM1 capable of cooperating with the processor 10. This storage medium is integrated or can be detachably mountable on the data coding and decoding device. For example, the storage medium is a floppy disk, or a CD-ROM.

Step E600 is the reception by the mobile station of a message which was broadcast by another mobile station. For this purpose, the processor 10 regularly reads the port 16 in order to check whether the radio module 50 has received data. When a data message has been received, the processor 10 reads the field 64 of the message in order to determine whether it contains the broadcasting address IFD, and the type of message in the field 68.

After the reception of a broadcast message, step E600 is followed by step E601, which is a test for checking whether the address ISS of the initial sending station contained in the field 61 of the message currently being processed is equal to the address of the station under consideration.

If the response is positive, this means that the message currently being processed was initially sent by the station under consideration. The latter does not store this message in its log, and performs no other processing on the message. Functioning of the algorithm is terminated.

If the response at step E601 is negative, this means that the message currently being processed was initially sent by another mobile station. Step E601 is then followed by step E602, at which the log of the station is updated. The updating consists of introducing the data relating to the message currently being processed into the station journal, as depicted in FIG. 5. Step E602 includes the updating of the cost. Where the cost is the number of jumps, or of segments travelled, the cost stored is equal to the cost read in the field 66 of the message, incremented by one unit.

Step E602 is followed by step E603, which is a test for checking whether the message corresponds to a message already stored in the station log. The test consists of comparing the pair formed by the identifier ID of the message and of the address ISS of the station initially sending the message with the pairs formed by message identifier and address of the station initially sending the message which are stored in the log of the station under consideration.

If the response is positive, this means that there is a match between the message currently being processed and a message previously received and stored. The message is not broadcast by the station under consideration, since the corresponding message has already been broadcast, which avoids multiple broadcasts of messages containing the same data. Execution of the algorithm is terminated.

If the reply to step E603 is negative, this step is followed by step E604, which is the transmission of the message to the applications layer of the station in order to process the information received, that is to say the information which was contained in the data field 67 of the message.

The following step E605 is a consultation of the routing table in order to determine which are the stations adjacent to the station under consideration. A station adjacent to the station under consideration is a station capable of communicating bidirectionally with the station under consideration. In other words, the adjacent stations can be reached in one jump. The adjacent stations are the stations which are both final destination stations and intermediate destination stations in the routing table of the station under consideration.

Step E605 is followed by step E606, which is a test for determining whether the station under consideration has adjacent stations other than the intermediate sending station for the message currently being processed. The test consists of comparing the address of the adjacent stations with the address TSS contained in the field 63 of the message currently being processed.

If the reply is negative, it is unnecessary for the station under consideration to broadcast a message containing the data of the message currently being processed, since only the station sending the message currently being processed would receive this new message. Execution of the algorithm is terminated.

If the reply is positive at step E606, the latter is followed by step E607, at which a message is formed and broadcast. This step is the "rebroadcasting" of the message currently being processed, that is to say the new message corresponds to the message currently being processed and is formed in the same way.

The data field 67 of this message contains the information present in the data field of the message currently being processed. The address ISS of the initial sending station, the final destination station address FDS (here at the value IFD) and the message identifier ID are copied into the corresponding fields of the message currently being processed. The cost CT of this new message is updated by the station under consideration. The address TSS of the intermediate sending station for this new message is that of the station under consideration.

With reference once again to FIG. 1, it is assumed that the station $SM_a$ broadcasts a message. This message is heard by the station $SM_b$, which updates its log by storing the data relating to this message.

After checking that this message does not correspond to another message already stored in the log of the station $SM_b$, and that the station $SM_b$ has adjacent stations other than the station $SM_a$, in this case the stations $SM_c$ and $SM_d$, the station $SM_b$ broadcast having the same message identifier and the same initial sending station address as the first message.

This message is heard by the stations $SM_a$, $SM_c$ and $SM_d$.

The station $SM_a$ notes that it is the initial sending station of this second message. It performs no additional processing on this message.

The stations $SM_c$ and $SM_d$ store the data relating to the second message in their respective logs.

The station $SM_c$ checks that the second message does not correspond to another message already stored in the log and that it has adjacent stations other than the station $SM_b$, here the station $SM_d$. The station $SM_c$ forms a third message and broadcasts it.

This third message is heard by the stations $SM_b$ and $SM_d$, which store the data relating to the third message in their respective logs and find that the third message corresponds to a message already stored in their respective logs. Consequently they do not rebroadcast a message.

Again as regards the second message, the station $SM_d$ checks that the second message does not correspond to another message already stored in the log and that it has adjacent stations other than the station $SM_b$, here the stations $SM_c$ and $SM_e$. The station $SM_d$ forms a fourth message and broadcasts it.

This fourth message is heard by the stations $SM_c$ and $SM_e$, which store the data relating to the fourth message in their respective logs.

The station $SM_c$ notes that it corresponds to a message already stored in its log, and consequently does not rebroadcast a message.

The station $SM_e$ finds, by consulting its routing table, that its only adjacent station is the station $SM_d$, which is the intermediate sending station for the fourth message. Consequently it does not rebroadcast a message.

The message has thus been broadcast to all the stations in the network, with a limited number of rebroadcasts.

FIG. 7 depicts an algorithm used in each of the mobile stations in the network, when a data message is received, in order to process this message and to detect any link break. The algorithm includes steps E400 to E423 which are stored in the read-only memory 30. Step E400 is the reception of a message by the mobile station.

For this, the processor 10 regularly reads the port 16 in order to check whether the radio module 50 has received data. When a message is received, the processor reads the type of message in the field 68 indicating that it is a case of a data message.

After the reception of a message, the step E400 is followed by the step E401, which is a test to check whether the message corresponds to a message already stored in the station log. The test consists of comparing the pair formed from the identifier ID of the message and the address ISS of the initial sending station of the message with the pairs formed from the message identifier and message initial sending station address which are stored in the log of the station under consideration.

If the reply is negative, the step E401 is followed by the step E402 at which the data relating to the message in the course of processing are stored in the station log. The data stored are those depicted in FIG. 5. The step E402 includes updating of the cost. Where the cost is the number of jumps, or segments covered, the stored cost is equal to the cost read from the field 66 of the message, incremented by one unit. The step E402 is followed by the step E407, which will be described subsequently.

If the reply at the step E401 is positive, this means that there is correspondence between the message in the course of processing and a message previously received and stored. The step E401 is then followed by the step E403, which is a test to check whether the message in the course of processing and the message already stored which corresponds to it were sent by the same intermediate sending station. The test consists of comparing the intermediate sending station addresses relating to the two messages and stored in the respective fields 73. If the reply is positive, this means that the message in the course of processing is a retransmission of a previous message, between the same intermediate sending and destination stations, this retransmission being caused by a lack of reception of any acknowledgement by the intermediate sending station. The data relating to the message currently being processed are not stored. Step E403 is followed by step E404, at which the retransmission number NR of the corresponding message is incremented by one unit, and the time of hearing is updated. Step E404 is followed by step E407, which will be described subsequently.

If the reply at step E403 is negative, this means that the message in the course of processing and the message already stored which corresponds to it were sent by two distinct intermediate sending stations. This step is followed by step E405, at which the data relating to the message in the course of processing are stored in the station log, as depicted in FIG. 5. The step E404 includes updating of the cost. Where the cost is the number of jumps, or segments covered, the stored cost is equal to the cost read from the field 66 of the message, incremented by one unit.

The steps E405 and E406 are followed by the step E407, which is a test to determine whether the station under consideration is the intermediate destination station of the message in the course of processing. The test consists of comparing the address of the station and the intermediate destination station address TDS of the message.

If the station under consideration is not the intermediate destination station of the message in the course of processing, step E407 is followed by step E410, which is a test for checking whether the retransmission number NR has reached a predetermined maximum value. If the reply is negative, execution of the algorithm is terminated.

If the reply is positive at step E410, this means that the link between the intermediate sending station and the intermediate destination station is broken. Step E410 is followed by step E411, which is the consultation of the routing table of the station under consideration, in order to determine whether a path exists between the station under consideration and the final destination station of the message and which is the intermediate destination station of the station under consideration, according to the final destination station of the message.

The following step E412 is a test for checking whether the intermediate destination station determined at the previous step is the intermediate sending station of the message currently being processed. If the reply is positive, execution of the algorithm is terminated. This is because, if the next jump determined by the routing table is the station which has suffered the breaking of the link, it is unnecessary to send a specific routing message.

If the reply is negative, the station under consideration sends a specific routing message in order to indicate that there is a path between the station under consideration and the final destination station of the message currently being processed.

The specific routing message contains an indication of its type, and in its data field, for example the entire routing table of the station under consideration, or as a variant only the indication of the path (the next jump) between the station under consideration and the final destination station of the message in the course of processing as well as the associated cost.

The specific routing message can be broadcast with a horizon of 1, or in point to point mode, destined for the intermediate sending station of the message currently being processed, with the conventional advantages of these two modes.

If, at step E407, the station under consideration is the intermediate destination station of the message currently being processed, step E407 is followed by step E420, which is a test for determining whether the station under consideration is the final destination station of the message currently being processed. The test consists of comparing the address of the station and the address FDS of the final destination station of the message.

If the reply is positive, routing of the message is terminated, and step E420 is followed by step E421, which is the transmission of the message to the applications layer of the station in order to process the information received, that is to say the information which was contained in the data field 67 of the message.

If the reply at step E420 is negative, this step is followed by step E422, which is the consultation of the routing table of the station under consideration, in order to determine which is the intermediate destination station to which the station under consideration is to send a message containing the data to be transported, as a function of the final destination station of the message.

The following step E423 is the formation of a message and the sending of this message to the intermediate destination station previously determined, whose address is written in the field 64 of this new message. The address ISS of the initial sending station, the address FDS of the final destination station, the message identifier ID and the data proper of this new message are copied into the corresponding fields of the message currently being processed. The cost CT is updated by the station under consideration. The address TSS of the intermediate sending station of this new message is that of the station under consideration.

FIG. 8 depicts an algorithm used in each of the mobile stations of the network, when a specific routing message is received, in order to process this message. The algorithm includes steps E500 to E503, which are stored in the read-only memory 30.

Step E500 is the reception of a message by the mobile station. For this purpose, the processor 10 regularly reads the port 16 in order to check whether the radio module 50 has received data.

After the reception of a message, step E500 is followed by step E501, which is a test for checking whether the message is a specific routing message. The test consists of analysing the type of message. If the reply is negative, execution of the algorithm is terminated.

If the response is positive, step E501 is followed by step E502, which is a test for determining whether the station under consideration is the destination of the specific routing message. This information is included in the specific routing message, when it is sent in point to point mode. When the specific routing message is sent in broadcast mode, it contains a broadcast address. In this case, the station under consideration is the destination of the specific routing message. From the point of view of the station under consideration, the two cases are equivalent.

If the response is negative at step E502, execution of the algorithm is terminated.

If the response is positive, step E502 is followed by step E503, at which the station analyses the specific routing message and amends its routing table accordingly. Amending the routing table results in modifying the paths used to transport the subsequent messages.

Where the station receives several specific routing messages coming from several mobile stations, the mobile station compares these messages in order to determine which intermediate station provides a path to the final destination with the lowest cost, or as a variant which intermediate station has the most adjacent stations. A combination of these criteria can also be taken into account. Taking into account the number of adjacent stations requires the transmission of the routing table as a whole. The station under consideration then chooses one of the stations and amends its routing table accordingly.

Naturally, the present invention is in no way limited to the embodiments described and depicted, but quite on the contrary encompasses any variant within the capability of persons skilled in the art.

Notably, the invention applies to any type of distributed network having mobile stations. By way of example, a constellation of satellites in low orbit (non-geostationary) can constitute such a network. The routing of communications between these satellites can be analysed by the present invention, so as to detect link breaks and transmit the corresponding information.

What is claimed is:

1. A method of broadcasting messages between a plurality of stations in a wireless network, each station having a memory storing a respective first table containing identifiers of final destination stations of messages associated with identifiers of intermediate destination stations of messages, wherein any station under consideration performs the method when it receives a message, the method comprising the steps of:

storing, in a second table, data relating to a received message including at least one message identifier and an identifier of a station sending the message;

comparing the message identifier with message identifiers previously stored in the second table;

seeking, in the first table of the station under consideration, a group of stations which are both a final destination station and an intermediate destination station; and broadcasting over the wireless network a second message in a case where the identifier of the received message is different from the message identifiers previously stored in the second table and where the group includes at least one station different from the station which sent the message.

2. A method according to claim 1, wherein the second message has a message identifier corresponding to the received message and an intermediate sending station address corresponding to the station under consideration.

3. A method according to claim 1, wherein the message identifier of the second message includes an address of an initial sending station for a first of a set of previous messages having the same message identifier as the received message.

4. A communication station in a wireless network, having a memory storing a respective first table containing identifiers of final destination stations of messages associated with identifiers of intermediate destination stations for messages, comprising:

means of storing in a second table, data relating to a received message including at least one message identifier and an identifier of a station sending the message;

means of comparing the message identifier of the received message with message identifiers previously stored in the second table;

means of seeking in the first table a group of stations which are both a final destination station and an intermediate destination station; and means of broadcasting over the wireless network a second message in a case where the identifier of the received message is different from the identifiers previously stored in the second table and where the group includes at least one station different from a station which sent the received message.

5. A communication station according to claim 4, wherein the second message has a message identifier corresponding to the received message and an intermediate sending station address corresponding to the communication station.

6. A communication station in a wireless network, comprising:

a memory storing a respective first table containing identifiers of final destination stations of messages associated with identifiers of intermediate destination stations for messages, wherein, the communication station is adapted to cooperate with:

means of storing in a second table, data relating to a received message including at least one message identifier and an identifier of a station sending the message;

means of comparing the message identifier of the received message with message identifiers previously stored in the second table;

means of seeking in the first table a group of stations which are both a final destination station and an intermediate destination station; and means of broadcasting over the wireless network a second message in a case where the identifier of the received message is different from the identifiers previously stored in the second table and where the group includes at least one station different from the station which sent the received message.

7. A method of routing messages between a plurality of stations in a wireless network, each station having a memory storing a respective first table containing identifiers of final destination stations of messages respectively associated with identifiers of intermediate destination stations of messages, wherein any station under consideration performs the method when it receives a data message, the method comprising the steps of:

storing, in a respective second table, data concerning the received message, including at least one message identifier, an intermediate sending station identifier identifying an intermediate sending station from which the received message was sent, an intermediate destination station identifier identifying an intended intermediate destination station, a final destination station identifier, and a message retransmission number (NR); and wherein, in a case where the message retransmission number reaches a predetermined value, the station under consideration is not the intended intermediate destination station, and the station under consideration has in its first table a final destination station identifier associated with an intermediate destination station identifier different from that of the intermediate sending station, sending a specific routing message, over the wireless network, intended for the intermediate sending station in order to indicate the existence of a path between the station under consideration and the final destination station.

8. A method according to claim 7, wherein the specific routing message includes at least an address of the station under consideration, an address of the final destination station of the received message, and a cost of transmission between the station under consideration and the final destination station for the message.

9. A method according to claim 7, wherein the specific message contains the first table of the station under consideration.

10. A method according to claim 7, wherein the message identifier includes an address of the initial sending station for a first of a set of previous messages having the same message identifier as the received message.

11. A communication station in a wireless network, having a memory for storing a respective first table containing identifiers of final destination stations of messages respectively associated with identifiers of intermediate destination stations of messages, comprising:

means of storing, in a respective second table, data concerning received messages, the data for each received message including at least one message identifier, an intermediate sending station identifier identifying an intermediate sending station, an intermediate destination station identifier identifying an intended intermediate destination station, a final destination station identifier identifying a final destination station, and a message retransmission number;

means of checking whether the message retransmission number (NR) has reached a predetermined value, whether the communication station is the intended intermediate destination station, and whether the communication station has in its first table a final destination station identifier associated with an intermediate destination station identifier which is different from that of the intermediate sending station; and means of sending over the wireless network a specific routing message destined for the intermediate sending station in order to indicate the existence of a path between the communication station and the final destination station.

12. A communication station according to claim 11, wherein the sending means are adapted to form the specific routing message so that it includes at least an address of the communication station, an address of the final destination station of the received message, and a cost of transmission between the communication station and the final destination station of the received message.

13. A communication station according to claim 11, wherein the sending means are adapted to form the specific routing message so that it includes the first table of the communication station.

14. A communication station in a wireless network, comprising:

a memory, for storing a respective first table containing identifiers of final destination stations of messages respectively associated with identifiers of intermediate destination stations of messages, wherein the communication station is adapted to cooperate with:

means of storing, in a respective second table, data concerning received data messages, the data including at least one message identifier, an intermediate sending station identifier identifying an intermediate sending station, an intermediate destination station identifier identifying an intended intermediate destination station, a final destination station identifier identifying a final destination station, and a message retransmission number;

means of checking whether the message retransmission number has reached a predetermined value, whether the communication station is not the intended intermediate destination station, and whether the communication station has in its first table a final destination station identifier associated with an intermediate destination station identifier which is different from that of the intermediate sending station; and means of sending over the wireless network a specific routing message destined for the intermediate sending station in order to indicate the existence of a path between the communication station and the final destination station.

15. A storage medium storing a program for broadcasting messages between a plurality of stations in a wireless network, each station having a memory storing a respective first table containing identifiers of final destination stations of messages associated with identifiers of intermediate destination stations of messages, said program comprising executable-process steps to be performed for any station under consideration receiving a message, the executable process steps comprising:

storing, in a second table, data relating to a received message, including at least one message identifier and an identifier of a station sending the received message;

comparing the message identifier with message identifiers previously stored in the second table;

seeking, in the first table of the station under consideration, a group of stations which are both a final destination station and an intermediate destination station; and broadcasting a second message over the wireless network in a case where the identifier of the received message is different from the identifiers previously stored in the second table and where the group includes at least one station different from the station which sent the message.

16. A storage medium according to claim 15, wherein said storage medium is a floppy disk or a CD-ROM.

17. A storage medium detachably mountable on a communication station in a wireless network having a memory storing a respective first table containing identifiers of final destination stations of messages associated with identifiers of intermediate destination stations for messages, said station comprising:

means of storing, in a second table, data relating to a received message including at least one message identifier, and an identifier of a station sending the received message;

means of comparing the message identifier with message identifiers previously stored in the second table;

means of seeking, in the first table, a group of stations which are both a final destination station and an intermediate destination station; and means of broadcasting a second message over the wireless network in a case where the identifier of the received message is different from the identifiers previously stored in the second table and where the group includes at least one station different from the station which sent the message.

18. A storage medium storing a program for routing messages between a plurality of stations in a wireless network, each station having a memory storing a respective first table containing identifiers of final destination stations of messages respectively associated with identifiers of intermediate destination stations of messages, said program performing executable process steps in a case where any station under consideration receives a data message, the executable process steps comprising:

storing, in a respective second table, data concerning the received message including at least one message identifier, an intermediate sending station identifier identifying an intermediate sending station, an intermediate destination station identifier identifying an intermediate destination station, a final destination station identifier identifying a final destination station, and a message retransmission number; and in a case where the message retransmission number reaches a predetermined value, the station under consideration is not the intermediate destination station, and the station under consideration has in its first table a final destination station identifier associated with an intermediate destination station identifier different from that of the intermediate sending station, sending a specific routing message, over the wireless network, intended for the intermediate sending station in order to indicate the existence of a path between the station under consideration and the final destination station.

19. A storage medium detachably mountable on a communication station in a wireless network, said station having a memory for storing a respective first table containing identifiers of final destination stations of messages respectively associated with identifiers of intermediate destination stations of messages, said station comprising:

means of storing, in a respective second table, data concerning received data messages, the data including at least one message identifier, an intermediate sending station identifier identifying an intermediate sending station, an intermediate destination station identifier identifying an intended intermediate destination station, a final destination station identifier identifying a final destination station, and a message retransmission number;

means of checking whether the message retransmission number has reached a predetermined value, whether the communication station is not the intended intermediate destination station, and whether the communication station has in its first table a final destination station identifier associated with an intermediate destination station identifier which is different from that of the intermediate sending station; and means of sending over the wireless network a specific routing message destined for the intermediate sending station in order to indicate the existence of a path between the communication station and the final destination station.

* * * * *

UNITED STATES PATENT AND TRADEMARK OFFICE
CERTIFICATE OF CORRECTION

PATENT NO.   : 6,459,685 B1
DATED        : October 1, 2002
INVENTOR(S)  : Mahe

It is certified that error appears in the above-identified patent and that said Letters Patent is hereby corrected as shown below:

Column 9,
Line 33, "broadcast" should read -- broadcasts a second message, this new message --.

Column 10,
Line 6, begin a new paragraph at "Step E400 ..."; and
Line 7, delete the paragraph break after "mobile station."

Signed and Sealed this

Twenty-seventh Day of May, 2003

JAMES E. ROGAN
*Director of the United States Patent and Trademark Office*